United States Patent
Gupta et al.

(10) Patent No.: US 10,367,589 B2
(45) Date of Patent: Jul. 30, 2019

(54) RECEIVER FOR COHERENT OPTICAL TRANSPORT SYSTEMS BASED ON ANALOG SIGNAL PROCESSING AND METHOD THEREOF

(71) Applicants: Shalabh Gupta, Mumbai (IN); N. P. Nandakumar, Mumbai (IN); Anita Gupta, Mumbai (IN); Pawankumar Pradeepkumar Moyade, Maharashtra (IN)

(72) Inventors: Shalabh Gupta, Mumbai (IN); N. P. Nandakumar, Mumbai (IN); Anita Gupta, Mumbai (IN); Pawankumar Pradeepkumar Moyade, Maharashtra (IN)

(73) Assignee: Indian Institute of Technology Bombay, Mumbai (IN)

( * ) Notice: Subject to any disclaimer, the term of this patent is extended or adjusted under 35 U.S.C. 154(b) by 107 days.

(21) Appl. No.: 14/370,411

(22) PCT Filed: Jan. 4, 2013

(86) PCT No.: PCT/IN2013/000007
§ 371 (c)(1),
(2) Date: Jul. 7, 2014

(87) PCT Pub. No.: WO2013/132513
PCT Pub. Date: Sep. 12, 2013

(65) Prior Publication Data
US 2015/0162991 A1    Jun. 11, 2015

(30) Foreign Application Priority Data
Jan. 5, 2012    (IN) .............................. 30/MUM/2012

(51) Int. Cl.
*H04B 10/61* (2013.01)
*H04L 7/00* (2006.01)
*H04L 25/03* (2006.01)

(52) U.S. Cl.
CPC .......... *H04B 10/616* (2013.01); *H04B 10/61* (2013.01); *H04L 7/0075* (2013.01); *H04L 25/03057* (2013.01)

(58) Field of Classification Search
USPC ....................................................... 398/202
See application file for complete search history.

(56) References Cited

U.S. PATENT DOCUMENTS

| 5,822,143 | A | 10/1998 | Cloke et al. | |
|---|---|---|---|---|
| 2004/0258181 | A1* | 12/2004 | Popescu | H03H 15/00 375/327 |

(Continued)

FOREIGN PATENT DOCUMENTS

EP    2134008 A1    12/2009

OTHER PUBLICATIONS

International Search Report on PCT/IN2013/000007 dated Aug. 2, 2013.

(Continued)

*Primary Examiner* — David C Payne
*Assistant Examiner* — Omar S Ismail
(74) *Attorney, Agent, or Firm* — McCarter & English, LLP; David R. Burns (57) ABSTRACT

The present invention discloses a receiver for coherent optical transport systems based on analog signal processing and the method of recovering transmitted data by processing signals in electronic domain. In the present invention, high-speed electrical signals obtained from optical-to-electrical converters which carry transmitted data information in a coherent transport system are jointly processed in analog (Continued)

domain itself without converting these signals to the digital domain using high speed ADCs. Different processing steps which may include carrier phase & frequency offset recovery and compensation, polarization mode dispersion and/or chromatic dispersion, clock & data recovery and deserialization may be performed while keeping the information signals in analog domain itself.

13 Claims, 8 Drawing Sheets (56) References Cited

U.S. PATENT DOCUMENTS

| | | | | |
|---|---|---|---|---|
| 2005/0265439 | A1* | 12/2005 | Matsumura | H04L 25/03038 375/232 |
| 2006/0245761 | A1* | 11/2006 | Shastri | H04B 10/66 398/147 |
| 2007/0091995 | A1* | 4/2007 | Ibragimov | H03H 21/0012 375/233 |
| 2007/0173218 | A1* | 7/2007 | Oh | H03B 27/00 455/260 |
| 2008/0219383 | A1* | 9/2008 | Koslov | H04L 25/061 375/326 |
| 2009/0033381 | A1* | 2/2009 | Lee | H03L 7/085 327/156 |
| 2009/0080906 | A1* | 3/2009 | Tao | H04B 10/61 398/209 |
| 2009/0086808 | A1* | 4/2009 | Liu | H04B 1/68 375/233 |
| 2009/0252216 | A1* | 10/2009 | Carrer | H04L 25/03063 375/233 |
| 2010/0061488 | A1* | 3/2010 | Endres | H03G 3/3052 375/326 |
| 2010/0266291 | A1* | 10/2010 | Boffi | H04B 10/61 398/159 |
| 2011/0006825 | A1* | 1/2011 | Fludger | H04L 27/223 327/243 |
| 2011/0018596 | A1* | 1/2011 | Lee | H03L 7/085 327/156 |
| 2011/0150506 | A1* | 6/2011 | Tanimura | H04B 10/697 398/208 |
| 2011/0236025 | A1* | 9/2011 | Wagner | H03L 7/0807 398/115 |
| 2013/0022351 | A1* | 1/2013 | Arikawa | H04B 10/299 398/25 |

OTHER PUBLICATIONS

Ranter, Carl et al. "High Data Rate Transmitter Circuits: RF CMOS Design and Techniques for Design Automation," Springer Science + Business Media, Inc., ISBN 0306487136, 9780306487132, published 2004, p. 133.

Gupta, Prakash "Data Communications and Computer Networks," Prentice-Hall of India, ISBN 8120328469, 9788120328464, published 2006, pp. 7, 20, and 21.

\* cited by examiner

RECEIVER FOR COHERENT OPTICAL TRANSPORT SYSTEMS BASED ON ANALOG SIGNAL PROCESSING AND METHOD THEREOF

RELATED APPLICATIONS

This application is a 35 U.S.C. § 371 national stage filing of International Application No. PCT/IN2013/000007, filed on Jan. 4, 2013, which claims priority to Indian Patent Application Serial No. 30/MUM/2012, filed on Jan. 5, 2012, the entire contents of each of which are incorporated herein by reference.

FIELD OF THE INVENTION

The present invention generally relates to receivers for coherent optical data transmission systems and more particularly to a method of recovering transmitted data by processing signals in electronic domain.

BACKGROUND OF THE INVENTION

Optical communication links have to employ polarization multiplexing and coherent modulation & detection for increasing data rates in optical transport systems. Coherent links carrying more than 100-Gbps over single optical carrier have been demonstrated till date. Typically, receivers for coherent, polarization multiplexed transmission systems use ultra-fast ADCs (analog-to-digital converters) that convert electrical signals to the digital domain. These signals are then jointly processed using digital signal processors (DSPs) to recover the transmitted data.

In prior art, digitization of such high-speed signals is extremely difficult. Once the digitization is done, processing of these signals is also very challenging, since massive amount of computation is required to meet the extremely high throughput rates for real-time operation. Digitization of the signals obtained at the receivers of high-speed coherent optical links is extremely difficult because of the large bandwidth required for this purpose. High-speed ADCs add significant overheads in terms of power consumption, design complexity, chip area and cost.

In the view of the foregoing, there is a need for a receiver for processing data signals in coherent transmission system, in analog domain itself, without first converting them to digital domain using high-speed ADCs.

OBJECTS OF THE INVENTION

1. It is the primary object of the present invention to provide a receiver for coherent optical transmission system.
2. It is another object of the present invention to provide a method for recovering transmitted data in data transmission system.
3. It is another object of the present invention to provide a system and method for processing signals in analog domain.
4. It is another object of the present invention to provide a method for joint equalization of high speed signals.
5. It is another object of the present invention to provide a method of carrier phase recovery & compensation, and clock & data recovery from the high speed signals.
6. It is another object of the present invention to provide a receiver which consumes significantly less power.
7. It is another object of the present invention to provide a receiver which requires less chip area.
8. It is another object of the present invention to provide a receiver with significantly lower cost.

SUMMARY OF THE INVENTION

The present invention discloses a receiver for coherent optical transport systems based on analog signal processing and the method of recovering transmitted data by processing signals in electronic domain. In the present invention, high-speed electrical signals obtained from optical-to-electrical converters which carry transmitted data information in a coherent transport system are jointly processed in analog domain itself without converting these signals to the digital domain using high speed ADCs. Different processing steps which may include carrier phase & frequency offset recovery and compensation, polarization mode dispersion and/or chromatic dispersion, clock & data recovery and deserialization may be performed while keeping the information signals in analog domain itself. The receiver in accordance with the present invention consumes significantly less power and has less chip area hence requires less space with significantly lower cost.

DETAILED DESCRIPTION OF THE INVENTION

The present invention discloses a receiver for coherent optical transport systems based on analog signal processing and the method of recovering transmitted data by processing signals in electronic domain. The working of the receiver is explained in detail with reference to the accompanying drawings in accordance with an aspect of the present invention.

Figure 1:
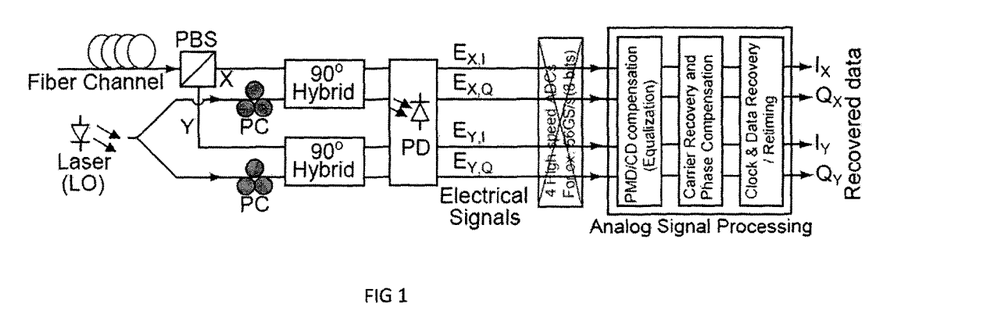
FIG. 1 is block diagram of a receiver for transmission system employing coherent modulation and polarization multiplexing and analog signal processing in accordance with an aspect of the present invention.

The high-speed complex electrical signals $E_X$ and $E_Y$) obtained from optical-to-electrical converters, which carry the transmitted data information in a coherent transport system, are jointly processed in the analog domain itself (without first conversion of these signals to the digital domain using high speed ADCs), as shown in FIG. 1. Here, the signals $E_X$ and $E_Y$ are complex, which can be represented as $E_X = E_{X,I} + jE_{X,Q}$ and $E_Y = E_{Y,I} + jE_{Y,Q}$, where $E_{X,I}$, $E_{X,Q}$, $E_{Y,I}$, and $E_{Y,Q}$ are the real signals shown in FIG. 1. Different processing steps, which may include (but may not be limited to) carrier phase & frequency offset recovery and compensation, polarization rotation compensation, equalization to compensate for polarization mode dispersion and/or chromatic dispersion, clock & data recovery and deserialization, may be performed while keeping the information signals in "analog domain" itself. However, the order in which these processing steps are undertaken is not important, as far as this invention is concerned. The "analog domain signals" being referred to here may be defined as the signals that are represented by a pair of differential voltages or a single ended voltage.

As shown in the block diagram of the receiver in FIG. 1, the optical signal from the fiber channel is split into two orthogonal polarizations X and Y using a polarization beam splitter (PBS) and each polarization signal is fed to a 90° optical hybrid, where it is mixed with the optical signal from local oscillator (LO) laser. The signals on in-phase and quadrature-phase components of the orthogonally polarized received optical fields are delivered to the balanced photo detectors (PD), where they are converted to electrical signals $E_{X,I}$, $E_{X,Q}$, $E_{Y,I}$, and $E_{Y,Q}$ shown in FIG. 1. These four signals are fed to an analog signal processing unit, which essentially consists of equalizer, carrier phase recovery & compensation (CPR) and clock & data recovery (CDR) modules. Joint processing of all four real signals $E_{X,I}$, $E_{X,Q}$, $E_{Y,I}$ and $E_{Y,Q}$ (shown in FIG. 1) from the two polarizations, is required if at least one of the polarizations carries 2-bits of data per symbol period (such as in QPSK modulation) and the second polarization also carries some independent information (i.e. at least one bit per data symbol period). Therefore, the receiver is specifically useful when overall at least 3-bits are transmitted per data symbol period, i.e. if the bit rate R is at least 3 times the baud rate.

The description of analog processing modules is explained below in accordance with an aspect of the present invention.

Analog Signal Processing Equalizer:

Since chromatic dispersion (CD) and polarization mode dispersion (PMD) are linear in nature, they can easily be compensated using tapped delay line equalizers (that act as linear transversal filters). Linear equalizer primarily has three unit operations—delay, multiplication and addition. In analog domain, high-speed multiplication can easily be performed using a variable gain amplifier or a Gilbert cell with less than 10 transistors. Similarly, summation of signals can be performed by simply adding currents onto a resistor. In addition, filter coefficients can be represented by charge stored on capacitors.

For dual polarization signals, the multidimensional transversal filter used to equalize the linear dispersive effects can be described by the following equations:

$$\tilde{x} = h_{xx}^T x + h_{yx}^T y \quad (1.1)$$

$$\tilde{y} = h_{xy}^T x + h_{yy}^T y \quad (1.2)$$

Where, x and y are column vectors of the delayed complex input electrical signals corresponding to two polarization channels $\tilde{x}$ and $\tilde{y}$ are the complex equalized outputs. $h_{xx}$, $h_{xy}$, $h_{yx}$, $h_{yy}$ are the column vectors of the complex filter coefficients.

Update of Equalizer Coefficients:

The update of complex filter coefficients can be done using any of the adaptive signal processing algorithms. For example, update equations using least mean square algorithm (LMS) and constant modulus algorithm (CMA) are explained below.

Least Mean Square Algorithm:

The LMS update equations for complex coefficients of the multidimensional equalizer can be represented as:

$$h_{xx,k}(t) = \beta \int x(\tau - k\tau_d) \cdot e_x^*(\tau) \cdot d\tau \quad (1.3)$$

$$h_{yx,k}(t) = \beta \int y(\tau - k\tau_d) \cdot e_x^*(\tau) \cdot d\tau \quad (1.4)$$

$$h_{xy,k}(t) = \beta \int x(\tau - k\tau_d) \cdot e_y^*(\tau) \cdot d\tau \quad (1.5)$$

$$h_{yy,k}(t) = \beta \int y(\tau - k\tau_d) \cdot e_y^*(\tau) \cdot d\tau \quad (1.6)$$

where, $x(t) = x_I(t) + jx_Q(t)$ & $y(t) = y_I(t) + jy_Q(t)$ are input signals to the equalizer in X and Y polarizations, $e_x(t) = e_x^I(t) + je_x^Q(t)$ & $e_y(t) = e_y^I(t) + je_y^Q(t)$ are error signals in X and Y polarizations, $T_d$ is the delay provided by a delay stage, and $0 \leq k \leq L$. Here L is the number of delay stages per dimension of the equalizer. The real and imaginary parts of $h_{xx,k}(t)$ in Equation 1.3 are given by:

$$Re\{h_{xx,k}(t)\} = \beta \int [x_I(\tau - k\tau_d) \cdot e_x^I(\tau) + x_Q(\tau - k\tau_d) \cdot e_x^Q(\tau)] d\tau \quad (1.7)$$

$$Im\{h_{xx,k}(t)\} = \beta \int [x_Q(\tau - k\tau_d) \cdot e_x^I(\tau) + x_I(\tau - k\tau_d) \cdot e_x^Q(\tau)] d\tau \quad (1.8)$$

Similarly, expression for other coefficients can also be determined.

Constant Modulus Algorithm:

The CMA update equations for complex coefficients of the multidimensional equalizer can be represented as:

$$h_{xx,k}(t) = \beta \int x(\tau - k\tau_d) \cdot \tilde{x}^*(\tau) \cdot (1 - |\tilde{x}|^2) \cdot d\tau \quad (1.9)$$

$$h_{yx,k}(t) = \beta \int y(\tau - k\tau_d) \cdot \tilde{x}^*(\tau) \cdot (1 - |\tilde{x}|^2) \cdot d\tau \quad (1.10)$$

$$h_{xy,k}(t) = \beta \int x(\tau - k\tau_d) \cdot \tilde{y}^*(\tau) \cdot (1 - |\tilde{y}|^2) \cdot d\tau \quad (1.11)$$

$$h_{yy,k}(t) = \beta \int y(\tau - k\tau_d) \cdot \tilde{y}^*(\tau) \cdot (1 - |\tilde{y}|^2) \cdot d\tau \quad (1.12)$$

where, $x(t) = x_I(t) + jx_Q(t)$ & $y(t) = y_I(t) + jy(t)$ are input signals to the equalizer in X and Y polarizations, $\tilde{x}$ & $\tilde{y}$ are equalized signals in X and Y polarizations, $T_d$ is the delay provided by a delay stage, and $0 \leq k \leq L$. Here L is the number of delay stages per dimension of the equalizer.

Equalizer Architecture:

The equalizer can be implemented as a feed forward equalizer (FFE) or as a decision feedback equalizer (DFE). The description of FFE and DFE are explained below in detail.

Figure 2:
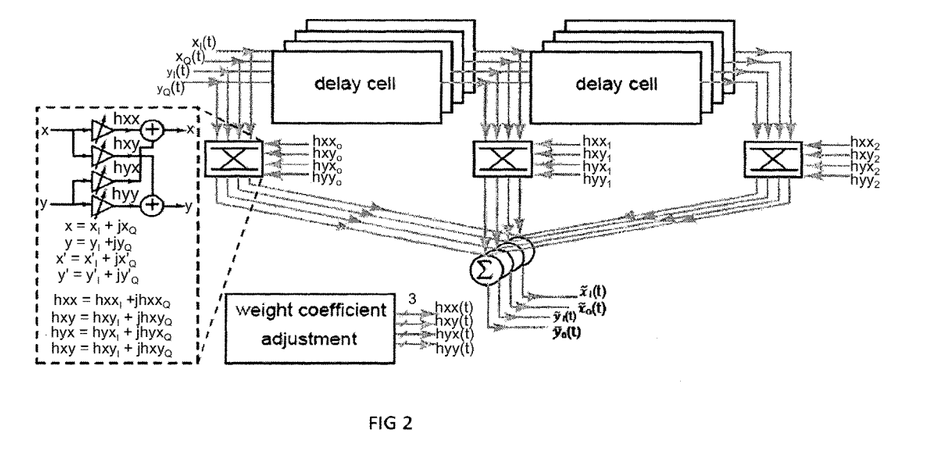
FIG. 2 is block diagram of a feed forward equalizer (FFE) for joint equalization of the signals received in a polarization multiplexed coherent optical link in accordance with an aspect of the present invention.

Feed Forward Equalizer:

In the proposed invention joint equalization of the high-speed signals can be performed using a feed forward equalizer (FFE), which involves addition of the four high-speed analog signals (obtained from the photo-detectors) and their delayed versions (with different delays) with proper weight coefficients, in terms of voltages or currents. As a result, four new analog signals are obtained and are termed as equalizer outputs. Threshold detectors can be used on these signals to obtain the estimates of transmitted data symbols. The number of delay cells (and taps) can be varied depending on the requirement, and the figure just illustrates some examples. FIG. 2 shows the block diagram of a feed forward equalizer having 3 taps. Here the delay line is having two delay stages with four delay cells (one for each real signal) in each stage. Each delay stage delays the signal by $T_d$ seconds. Signals tapped from the delay line are multiplied with the filter coefficients in butterfly multipliers as shown in the block diagram. Outputs from butterfly multipliers are added together to generate equalized signals, $\sim x_I(t)$; $\sim x_Q(t)$; $\sim y_I(t)$ and $\sim y_Q(t)$. Weight coefficient adjustment is done using adaptive algorithms.

Figure 3:
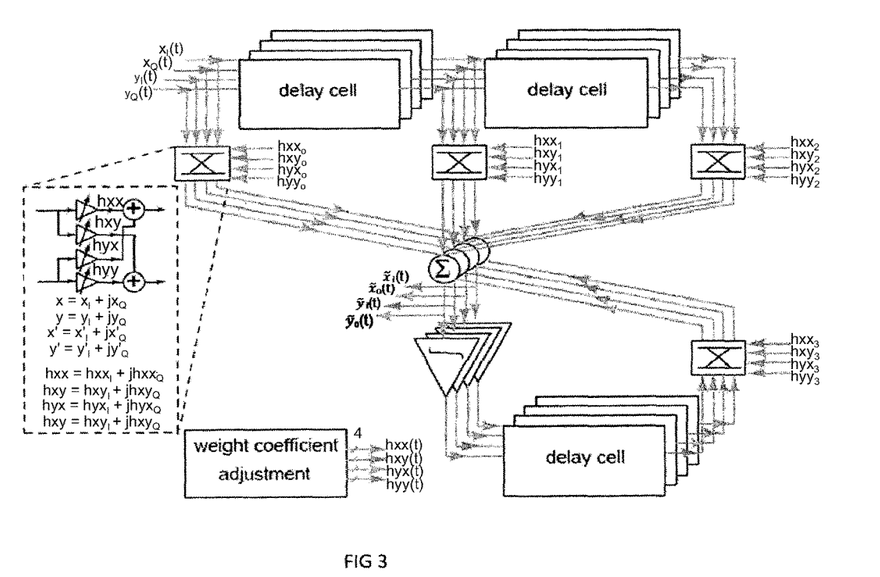
FIG. 3 is block diagram of a decision feedback equalizer (DFE) for joint equalization of the signals received in a polarization multiplexed coherent optical link in accordance with an aspect of the present invention.

Decision Feedback Equalizer:

In another embodiment of the present invention the joint equalization can also be performed using a decision feedback equalizer (DFE) with the analog processing method, as shown in FIG. 3. In the DFE, the delayed copies of the "analog signals" obtained after threshold detection from the FFE (with different delays) are fed back and added, with proper weights, to the signals at the inputs of the threshold detectors. The number of delay cells (and taps) can be varied depending on the requirement.

Decision feedback equalizer has both feed forward and feedback taps. FIG. 3 shows the block diagram of a DFE having 3 feed forward taps and 1 feedback tap. Here, decisions are made on the equalized signals $\sim x_I(t)$; $\sim x_Q(t)$; $\sim y_I(t)$ and $\sim y_Q(t)$. Delayed and weighted versions of the decision are fed back to the summation block of the equalizer. Adaptive algorithms as described in equalizer coefficients section are used for weight coefficient adjustment.

Weight coefficients required for adding the signals have to be obtained adaptively by another block in the equalizer (i.e. the Weight Coefficient Adjustment block) as shown in FIG. 2. Different algorithms can be used for adjustment of the weight coefficients, such as CMA (constant modulus algorithm), LMS (least mean squared) algorithms etc. Since these weight coefficients themselves have to vary at a much slower rate (according to the dynamics of the channel) than the high-speed data carrying signals, these coefficients can themselves be easily updated and stored in the digital domain. In another embodiment, it is possible to update these signals in the analog domain itself. In this case, the algorithms mentioned above for weight coefficient adjustment can be implement in continuous time mode using different operations (such as addition, subtraction, multiplication etc.) in analog domain, and the storage of weight coefficients on capacitive elements.

Carrier Phase Recovery and Compensation:

In the present invention, the operation of carrier phase recovery and compensation is also performed in the analog domain. The four signals obtained from the equalizer, i.e. two each corresponding to the two orthogonal polarizations, are sent to two carrier phase recovery and correction blocks, each corresponding to one polarization. Architectures based on different algorithms, such as $m^{th}$ power method, reverse modulation technique, or Costas Loop can be employed for these blocks.

Figure 4:
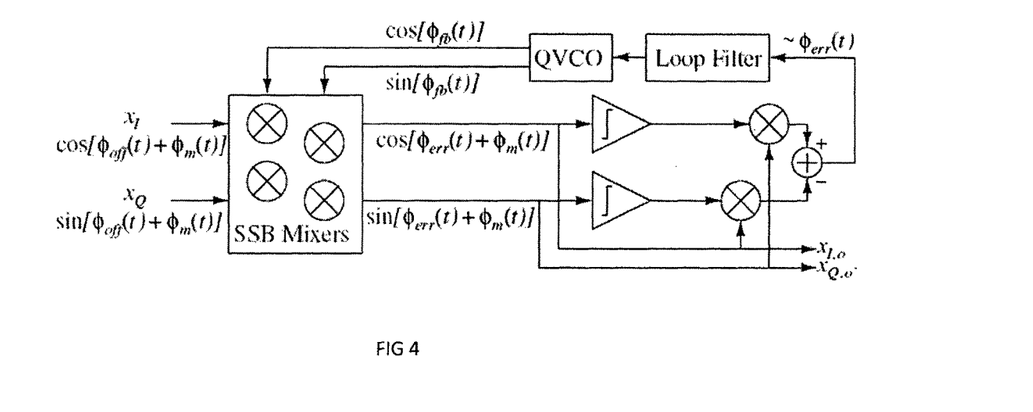
FIG. 4 is block diagram of costas loop based carrier phase recovery and correction architecture for QPSK signals in accordance with an aspect of the present invention.

A Costas Loop based technique for Quadrature Phase Shift Keying (QPSK) modulation is shown in FIG. 4. In this method, for each pair of incoming signals from the equalizer, i.e. $(x_I, x_Q)$ and $(y_I, y_Q)$, the architecture shown in FIG. 4 can be used. The phases of the incoming signals contain the time varying carrier phase (and frequency) offset represented by the phase $\Phi_{in}(t)$ and the message phase represented by $\Phi_m(t)$. Single sideband mixing of these signals with the QVCO (Quadrature phase Voltage Controlled Oscillator) outputs results in subtraction of $\Phi_{fb}(t)$ from the phases of $x_I$ and $x_Q$. The whole system behaves like a Phase Locked Loop. There is a small residual phase error Φerr(t) in the outputs of the SSB mixers. Applying threshold detectors (or limiters) to the signals obtained from the SSB mixers results in the estimates of the transmitted data symbols. Further, multiplication of these signals with the signals from the SSB mixers, followed by subtraction, as shown in FIG. 4, results in a signal which is roughly proportional to $\Phi_{err}(t)$, when $\Phi_{err}(t)$ is small. The signal, goes to a loop filter, followed by QVCO that generates $\cos(\Phi_{fb}(t))$ and $\sin(\Phi_{fb}(t))$ for the single sideband mixers.

The implementation of different blocks in of the carrier phase recovery module may be done completely in the analog domain. However, some components, such as the QVCO and the loop filter, can be implemented in the digital domain as well, although, the high speed data carrying signals are not digitized and remain in the analog domain only to avoid high speed ADCs and DSP. The threshold detection (or limiter) operation is not being considered as an ADC operation here (since the number of bits at the output of the threshold detector) is not more than the number of bits represented by the analog signal.

In the proposed receiver decision assisted version of Costas phase-locked loop (PLL) has been used for carrier phase recovery. The block diagram of carrier phase recovery is shown in FIG. 4. Normalized in-phase and quadrature-phase components of the input are given by:

$$x_I = \cos(\phi_{off}(t) + \phi_m(t)) \quad (1.13)$$

$$x_Q = \sin(\phi_{off}(t) + \phi_m(t)) \quad (1.14)$$

where, $\Phi_{off}(t) = (w_s - w_{lo})t + \Phi_1 - \Phi_2$ is the resultant phase offset between the incoming carrier and the LO signal. The output of balanced detector is mixed with the local oscillator signal using a single side band (SSB) mixer. The output I and Q components of the SSB mixer are given as:

$$I_{SSB} = \cos(\phi_m(t) + \phi_{err}(t)) \quad (1.15)$$

$$Q_{SSB} = \sin(\phi_m(t) + \phi_{err}(t)) \quad (1.16)$$

where, $\Phi_{err}(t) = \Phi_{off}(t) - \Phi_{fb}(t)$, which will be negligible once locking is achieved. Here, $\Phi_{fb}(t)$ is the phase of the quadrature voltage controlled oscillator (QVCO) outputs. Decisions are made on $I_{SSB}$ and $Q_{SSB}$ and passed onto multipliers which will act as correlators. Difference between the product signals, $v_e = \sin(\Phi_{err}(t))$ is used to control frequency and phase of the QVCO after passing through a loop filter. If the error is very small, it can be approximated as $\Phi_{err}(t)$. When QVCO is locked to the beat signal of carrier and local oscillator, the error voltage becomes zero, and the output of SSB mixer gives baseband signal without phase offsets.

Figure 5:
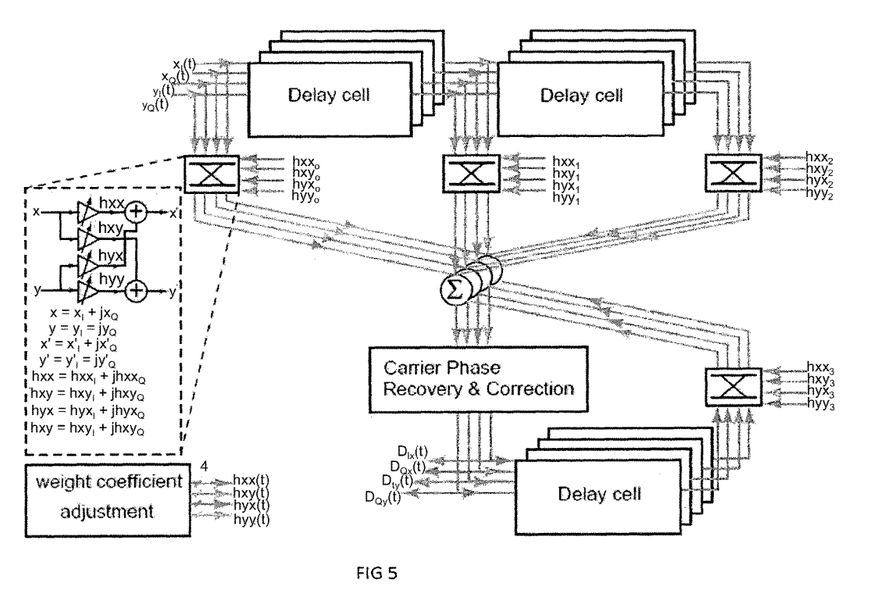
FIG. 5 is an illustration of a practical implementation of carrier phase recovery and equalizer blocks combined together in accordance with an aspect of the present invention.

In the present invention, it is not necessary that the equalizer block, the carrier phase recovery & compensation block, and the clock & data recovery block are placed sequentially in the flow the data signals. For example, as shown in FIG. 5, a practical implementation may involve a feed-forward equalizer block, followed by a carrier phase recovery and correction block, which is followed by decision feedback block which feeds signals back to the outputs of the feed-forward block. The final signals coming out of these blocks ($D_{Ix}$, $D_{Qx}$, $D_{Iy}$, and $D_{Qy}$), which represent the estimates of the transmitted signals, are sent to clock and data recovery circuits, which may be implemented using conventional techniques, to finally get the desired data signals.

Depending on the amount of dispersion that needs to be compensated, the proposed analog receiver coherent receiver can have different forms as explained below.

Figure 6:
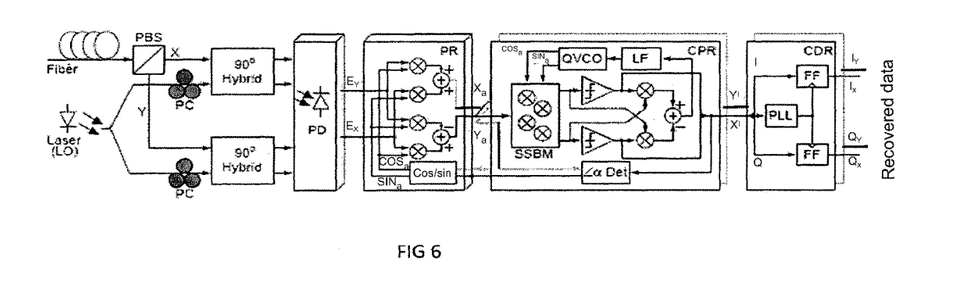
FIG. 6 is block diagram of analog coherent receiver for short distance links in accordance with an aspect of the present invention.

Analog Coherent Receiver for Short Distance Links:

Architecture of the proposed analog coherent receiver is shown in FIG. 6. Since dispersion is very low in short distance links, a polarization rotator (PR) block can be used instead of equalizer. In-phase and quadrature-phase components of EX ($E_{X,I}$ and $E_{X,Q}$) and $E_Y$ ($E_{Y,I}$ and $E_{Y,Q}$) are jointly processed in analog domain using PR and CPR modules to retrieve the transmitted data. PR module rotates the polarization by an angle α, where −α is the angle of polarization rotation introduced in the channel and receiver PBS. The angle α obtained from the CPR module is used for generating cos α and sin α. The outputs of the PR module are given by:

$$\begin{pmatrix} X_\alpha \\ Y_\alpha \end{pmatrix} = \begin{pmatrix} \cos\alpha & -\sin\alpha \\ \sin\alpha & \cos\alpha \end{pmatrix} \cdot \begin{pmatrix} E_{X,I} + jE_{X,Q} \\ E_{Y,I} + jE_{Y,Q} \end{pmatrix}$$

Where, $X_\alpha = X_{\alpha,I} + j X_{\alpha,Q}$ and $Y_\alpha = Y_{\alpha,I} + j Y_{\alpha,Q}$. the signals $X_\alpha$ and $Y_\alpha$ are then fed to the CPR module.

The CPR module has two independent Costas loops—one for each polarization. Each of the incoming signals to the CPR module is passed through a single side band mixer (SSBM), where it is getting mixed with the quadrature signals (cos Φ and sin Φ) corresponding to the phase error Φ due to carrier phase & frequency offsets. Input signals to the SSBMs for X and Y polarizations can be represented as:

$$X_\alpha = \cos[\phi_{m,X}(t)+\phi_X(t)] + j\sin[\phi_{m,X}(t)+\phi_X(t)]$$

$$Y_\alpha = \cos[\phi_{m,Y}(t)+\phi_Y(t)] + j\sin[\phi_{m,Y}(t)+\phi_Y(t)]$$

where, $\Phi_{m,X}(t)$ & $\Phi_{m,Y}(t)$ are the phases corresponding to the transmitted messages and $\Phi_X(t)$ & $\Phi_y(t)$ are the phase errors in X and Y polarizations respectively. The in-phase and quadrature-phase signals at SSBM outputs are given as:

$$X_{I,SSBM} = \cos[\phi_{m,X}(t)+\phi_{res,X}(t)]$$

$$X_{Q,SSBM} = \sin[\phi_{m,X}(t)+\phi_{res,X}(t)]$$

$$Y_{I,SSBM} = \cos[\phi_{m,Y}(t)+\phi_{res,Y}(t)]$$

$$Y_{Q,SSBM} = \sin[\phi_{m,Y}(t)+\phi_{res,Y}(t)]$$

where, $\Phi_{res,X}$ and $\Phi_{res,Y}$ are the negligible residual phase errors in X and Y polarizations respectively.

Decision is made on the in-phase and quadrature-phase components of the SSBM outputs and fed to multipliers which act as cross-correlators. Phase error is calculated by subtracting the multiplier outputs and is passed through a loop filter to generate control voltage for quadrature voltage controlled oscillator (QVCO). A similar cross-correlator structure is used for finding the polarization rotation angle α.

The PR and CPR modules are essentially phase-locked loops (PLLs), the parameters of which can be optimized based on the dynamics of the system, such as laser line widths and speed of polarization rotation. The estimated signals X' and Y' corresponding to X and Y polarizations are passed on to a clock and data recovery (CDR) module which re-times (and deserializes) the transmitted data.

Analog Coherent Receiver with Equalizer for Longer Distance Links:

For longer distance optical links, where channel dispersion is significant, an equalizer need to be incorporated in the receiver. Two versions of such a receiver are described in detail with reference to the drawings in accordance with an aspect of the present invention.

Figure 7:
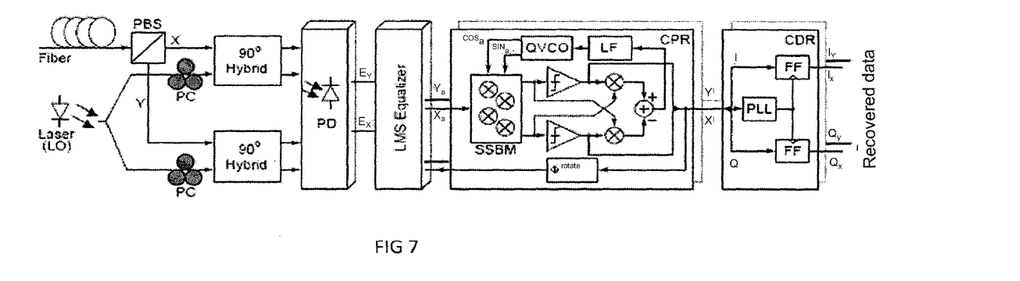
FIG. 7 is block diagram of analog coherent receiver with LMS based equalizer for long distance links in accordance with an aspect of the present invention.

Receiver with LMS Equalizer:

FIG. 7 shows the block diagram of an analog coherent receiver using an LMS based equalizer. In this architecture, decisions made in the CPR modules are fed back to the equalizer module after rotating by an angle −Φ, where Φ is the input angle to the QVCO. The fed back signals can be used as training signals or as decision signals for the DFE implementation of LMS equalizer.

Figure 8:
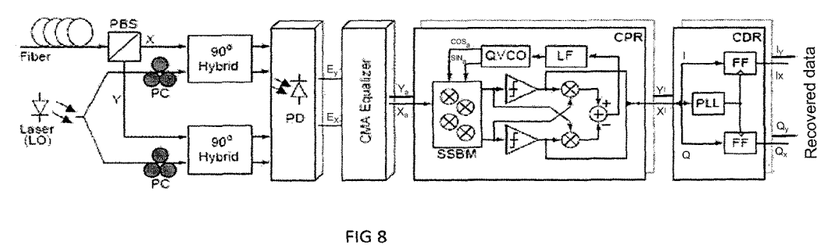
FIG. 8 is block diagram of analog coherent receiver with CMA based equalizer for long distance links in accordance with an aspect of the present invention.

Receiver with CMA Equalizer:

CMA equalizer doesn't need decisions made on the signals for convergence. Hence, CMA equalizer can always be implemented as an FFE structure. An analog coherent receiver employing CMA equalizer is shown in FIG. 8. In this architecture, signals from the photo detector are equalized in a CMA based FFE and the outputs are fed to two independent CPRs (one for each polarization). Rest of the signal processing is similar to the previous architectures.

We claim:

1. A receiver for coherent optical transport systems based on analog signal processing, comprising:
    an analog signal processing module to jointly process one or more complex signals carrying message symbols with a bit rate at least three times baud rate, said complex signal comprising two real analog signals, wherein said one or more complex signals from optical-to-electrical converters are passed directly to the analog signal processing module without being sampled or digitized and said analog signal processing module comprising:
        an equalizer module implemented as a feed forward equalizer (FFE) for compensation of one of chromatic dispersion (CD) or polarization mode dispersion (PMD) or both in joint equalization process, wherein said feed forward equalizer (FFE) for joint equalization further comprises:
            at least one tap, and
            a delay line for more than one said tap comprising a delay stage with at least one delay cell in each of said delay stage; and
        at least one carrier phase recovery and compensation block.

2. The receiver as claimed in claim 1, wherein update of weight coefficients in said equalizer module is performed using adaptive signal processing algorithms.

3. The receiver as claimed in claim 1, wherein said equalizer module is implemented as a decision feedback equalizer (DFE) for compensation of one of chromatic dispersion (CD) or polarization mode dispersion (PMD) or both in joint equalization process.

4. The receiver as claimed in claim 2, wherein update of said weight coefficients is performed by one of least mean square algorithm (LMS) and constant modulus algorithm (CMA).

5. The receiver as claimed in claim 3, wherein said decision feedback equalizer (DFE) comprises:
    at least one feedback tap; and
    a delay line for more than one said tap comprising a delay stage with at least one delay cell in each of said delay stage.

6. The receiver as claimed in claim 1, wherein said carrier phase recovery and compensation block comprises:
    at least one quadrature voltage controlled oscillator (QVCO);
    at least one single side band (SSB) mixer; and
    at least one loop filter.

7. The receiver as claimed in claim 1, wherein a decision assisted version of Costas phase-locked loop (PLL) is used in said carrier phase recovery and compensation block.

8. A method of recovering transmitted data in a coherent optical link by jointly processing one or more complex signals in analog domain, comprising the steps of:
   compensating one of chromatic dispersion (CD) or polarization mode dispersion (PMD) or both using an equalizer module for signals with a bit rate at least three times baud rate, wherein updating of weight coefficients in said equalizer module is performed using adaptive signal processing algorithms, said equalizer module includes a transversal filter implemented in continuous time mode;
   recovering carrier phase; and
   compensating said carrier phase in said signals using a carrier phase recovery and compensation block wherein mixing of signal at the input of said carrier phase recovery block with the output of quadrature phase voltage controlled oscillator (QVCO) using single side band (SSB) mixers resulting the subtraction of offset phase from said input signals.

9. The method as claimed in claim 8, further comprising:
   implementing said equalizer module as a feed forward equalizer (FFE) for compensation of one of chromatic dispersion (CD) or polarization mode dispersion (PMD) or both in joint equalization process.

10. The method as claimed in claim 8, further comprising:
    implementing said equalizer module as a decision feedback equalizer (DFE) for compensation of one of chromatic dispersion (CD) or polarization mode dispersion (PMD) or both.

11. The method as claimed in claim 8, wherein update of weight coefficients in said analog processing equalizer module is performed by one of least mean square algorithm (LMS) and constant modulus algorithm (CMA).

12. The method as claimed in claim 8, wherein compensation of one of chromatic dispersion (CD) or polarization mode dispersion (PMD) or both, is carried out in one of FFE or DFE or both by obtaining outputs by adding analog signals at the input of said equalizer and their delayed versions from one or more delay stages multiplied with weight coefficients from a weight coefficient adjustment block.

13. The method as claimed in claim 8, wherein said carrier phase recovery and compensation block is implemented as decision assisted Costas loop.

\* \* \* \* \*